F. ACKERMAN.
AUTOMOBILE SIGNAL SIGN.
APPLICATION FILED JAN. 17, 1916.
1,260,949.
Patented Mar. 26, 1918.
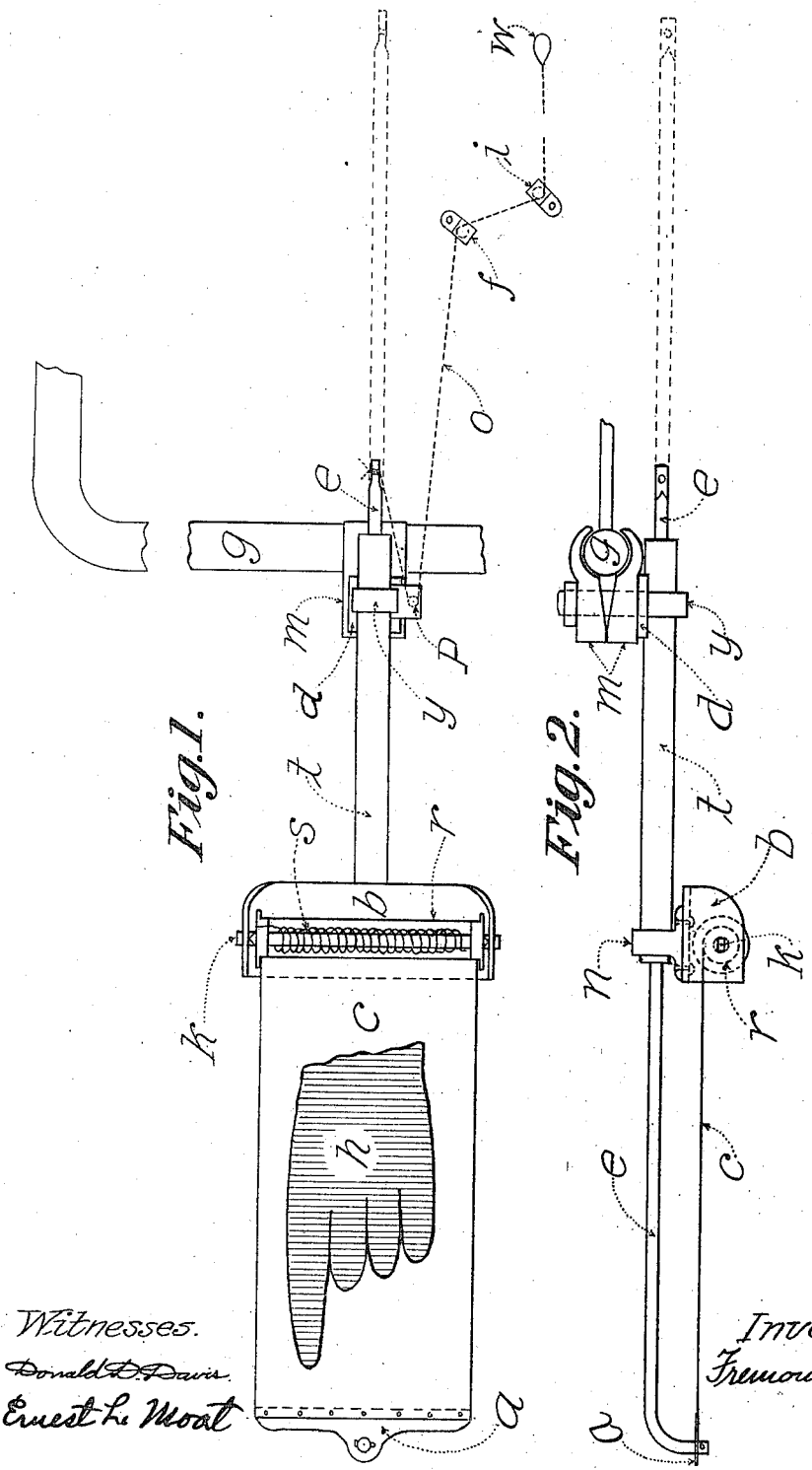
Witnesses.
Donald D. Davis
Ernest L. Moat
Inventor.
Fremont Ackerman

UNITED STATES PATENT OFFICE.

FREMONT ACKERMAN, OF LOS ANGELES, CALIFORNIA.

AUTOMOBILE SIGNAL-SIGN.

1,260,949.   Specification of Letters Patent.   Patented Mar. 26, 1918.

Application filed January 17, 1916.   Serial No. 72,611.

*To all whom it may concern:*

Be it known that I, FREMONT ACKERMAN, a citizen of the United States, residing at Los Angeles, in the county of Los Angeles and State of California, have invented a new and useful Automobile Signal-Sign, of which the following is a specification.

My invention relates to a new automobile signal sign to be used on automobiles or any vehicle and is designed to notify traffic when turning to the right or left.

In the drawings forming part of this application:

Figure 1— is a view of my improved signal in its operative position with a portion of the windshield in full lines and the operating cord shown in dotted lines.

Fig. 2— is a top plan of the main parts shown in Fig. 1 other parts being omitted for clearness of illustration.

Referring to the drawings, $g$ is the frame of the windshield of any approved make. To the lower portion of the windshield so as not to be interfered with by the swinging portion, I secure a tube $t$. Tube $t$ is attached to the shield by being passed through an eyebolt $y$ which passes through a grooved washer $d$ and clamp $m$. Clamp $m$ is in two parts and has curved ends which pass on both sides of frame $g$, as best shown in Fig. 2, and is held in position thereon by a nut on the end of eyebolt $y$. Slidably mounted in tube $t$ is an operating rod $e$ the front end of which is preferably curved. A strip of canvas $c$, preferably white, on which is placed a hand $h$ which is preferably colored red is secured to the front end of rod $e$ by a metal head $a$. This hand may be painted on the canvas or may be cut out of red cloth and stitched to the canvas and would be on both sides. The other end of the canvas is secured to a roller $r$ which is revolubly mounted in cage $b$ secured to tube $t$ by means of stationary rod $k$ which rod has square ends to prevent it from turning. The canvas with the hand thereon will be termed the signal. A spring $s$ is coiled on rod $k$ and one end is secured to the cage and the other end to the roller and when the signal is wound on the roller a slight tension is placed thereon to hold it from unwinding, and it is in its inoperative position and rod $e$ projects through tube $t$ to the position shown in dotted lines. Rod $e$ has secured thereto at its end farthest from the cage a cord $o$ which passes over direction changing pulleys. In the device I have installed on my car cord $o$ passes over a pulley $p$ attached to the clamp then over a pulley $f$ attached to the dashboard of the car, not shown, and then over a pulley $e$ attached to the upper end of the steering post and has on the end thereof a knob handle $w$. When the signal is in its inoperative position, that is rolled up, the handle is drawn to engagement with pulley $i$. The signal shown is installed on the left side of the dash and when the driver is going to turn to the left he catches the handle and pulls it out to the wheel on the steering post which he grips still holding the handle. This causes the signal to be projected out from the cage to the position shown in the drawings, its operative position, thereby notifying the traffic that he is going to turn to the left. It will be understood that a like device will be installed for the other side of the shield. After the corner is turned the driver releases the handle and the spring returns the signal and other parts to their inoperative position. The signal may be illuminated at night by a suitable light. By this construction it will be observed that I have provided a simple and inexpensive signal to indicate an intention to change the direction of travel which can be easily and quickly installed upon an automobile and which can be operated by the driver without in any manner interfering with his usual control of the steering wheel.

Having described my invention what I claim is:

1. A signal for vehicles comprising a tube; a cage secured to said tube; a stationary rod mounted in said cage; a roller revolubly mounted on said rod; a coiled spring on said rod within said roller, said spring having one end secured to the rod and the other end to the roller; a canvas signal having one end secured to said roller and wound thereon when in its inoperative position; an operating rod slidably mounted in said tube and having one end secured to the signal; an operating cord secured to the other end of said rod; direction changing pulleys secured to the machine over which said cord passes, one of said pulleys being mounted on the steering post, and a handle on the end of said cord.

2. A vehicle signal comprising a roller revolubly mounted in bearings secured to the vehicle; a signal flag having one end thereof secured to said roller and normally wound thereon; a spring having one end secured to said roller and the other end secured to said bearings and adapted to revolve said roller and wind said flag thereon when unrolled; a rod slidably mounted in bearings secured to the vehicle and having one end secured to the flag; and manually operated means to move said rod to unwind said flag.

FREMONT ACKERMAN.

Witnesses:
 DONALD D. DAVIS,
 ERNEST L. MOAT.